US008838826B2

(12) United States Patent
Galanes et al.

(10) Patent No.: US 8,838,826 B2
(45) Date of Patent: Sep. 16, 2014

(54) SCALABLE ROBUST LIVE STREAMING SYSTEM

(75) Inventors: Francisco Manuel Galanes, Wellesley, MA (US); Vijnan Shastri, Palo Alto, CA (US); Pawel Jurczyk, Brighton, MA (US)

(73) Assignee: Google Inc., Mountain View, CA (US)

( * ) Notice: Subject to any disclaimer, the term of this patent is extended or adjusted under 35 U.S.C. 154(b) by 154 days.

(21) Appl. No.: 13/439,678

(22) Filed: Apr. 4, 2012

(65) Prior Publication Data
US 2013/0268688 A1 Oct. 10, 2013

(51) Int. Cl.
*G06F 15/16* (2006.01)

(52) U.S. Cl.
USPC ........................................................ 709/231

(58) Field of Classification Search
USPC .................................................. 709/219, 231
See application file for complete search history.

(56) References Cited

U.S. PATENT DOCUMENTS

| 7,509,390 | B1 | | 3/2009 | Raman et al. | |
|---|---|---|---|---|---|
| 8,122,142 | B1 | * | 2/2012 | Svendsen et al. | 709/231 |
| 8,386,630 | B1 | * | 2/2013 | Atzmon | 709/231 |
| 8,566,680 | B1 | * | 10/2013 | Cousins | 714/781 |
| 2003/0079036 | A1 | * | 4/2003 | Terada et al. | 709/231 |
| 2003/0131098 | A1 | * | 7/2003 | Huntington et al. | 709/224 |
| 2007/0112972 | A1 | * | 5/2007 | Yonge et al. | 709/231 |
| 2008/0270729 | A1 | * | 10/2008 | Reddy et al. | 711/170 |
| 2009/0077252 | A1 | * | 3/2009 | Abdo et al. | 709/231 |
| 2010/0183101 | A1 | * | 7/2010 | Mundarath et al. | 375/341 |
| 2011/0072105 | A1 | | 3/2011 | Biderman et al. | |
| 2011/0083037 | A1 | | 4/2011 | Bocharov et al. | |
| 2011/0246616 | A1 | * | 10/2011 | Ronca et al. | 709/219 |
| 2012/0110372 | A1 | * | 5/2012 | Borgendale et al. | 714/4.11 |
| 2013/0185451 | A1 | * | 7/2013 | Gelter | 709/231 |

FOREIGN PATENT DOCUMENTS

| WO | 02067120 | 8/2002 |
|---|---|---|
| WO | 2010046722 | 4/2010 |
| WO | 2011068784 | 6/2011 |

OTHER PUBLICATIONS

International Search Report and Written Opinon for International Application Serial No. PCT/US2013/035139, dated Jul. 15, 2013, 15 pages.

* cited by examiner

*Primary Examiner* — Kostas Katsikis
(74) *Attorney, Agent, or Firm* — Amin, Turocy & Watson, LLP

(57) ABSTRACT

A system and method for a live streaming platform that can redundantly process input streams in parallel ingestion pipelines is disclosed herein. Ingested input streams in the parallel pipelines can be segmented using a stable segmentation function that creates identical segments in each of the streams in the pipelines. If errors occur, or there are disruptions in one or more of the input streams or pipelines, the live streaming platform can switch between the input streams on a per segment basis to provide reliable streaming feeds to a content distribution network. A master stream can be constructed from each of the master segments per a time period based on a reliability of each of the input streams and segments. Practicing pipeline affinity by selecting subsequent master segments from the same pipeline can minimize glitches.

21 Claims, 10 Drawing Sheets

SCALABLE ROBUST LIVE STREAMING SYSTEM

TECHNICAL FIELD

This disclosure relates generally to robust, scalable live streaming, and specifically to dynamically switching between coherent, redundant live streams for increased reliability.

BACKGROUND

Live streaming current events over the Internet increases the demand for a reliable streaming infrastructure. Live streaming feeds are commonly used in such circumstances as major political speeches and events, sporting events, and other cultural happenings in which a large viewing audience is relying on the live streaming feed to be functioning properly. However, due to the distributed nature of any processing and delivery system of this scale, component failure is unavoidable and can interrupt or otherwise affect the quality of the output stream.

Mission-critical live streaming on the web is done today by building redundancy by having separate hardware and/or software encoders pushing roughly equivalent streams to be redundantly encoded. This encoding takes place in completely separate encoding pathways that produce separate primary and secondary streams. Failovers, which are automatic switches to redundant streams, attempt to minimize disruptions but since they use discrete and/or diverse components, glitch free failovers are generally unattainable.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

Systems and methods disclosed herein relate to switching between redundant live streams that are processed in parallel ingestion pipelines. Disclosed herein is a system including a segmentation component that identifies segment boundaries in an ingested input stream and segments the input stream based on the segment boundaries. A buffer component buffers segments of a plurality of input streams, wherein the buffered segments are indexed and stored in a memory. A master selection component selects a master buffered segment per a time period from among the buffered segments for delivery to a content distribution network.

The master selection component can select the buffered segment from among the buffered segments of the plurality of the input streams based on a reliability signal of the buffered segment. The master selection component can also switch to a different input stream for a subsequent master buffered segment in response to a reliability signal of the input stream falling below a threshold value. A transcoding component is also disclosed that transcodes the input stream into a plurality of output streams with different bitrates and formats.

Also disclosed herein is a method including identifying segment boundaries in an ingested input stream and segmenting the input stream based on the segment boundaries. The method can include buffering segments of a plurality of input streams, wherein the buffering includes indexing and storing buffered segments in a memory. The method can also include selecting a master buffered segment per a time period from among the buffered segments for delivery to a content distribution network. The method can also include selecting a subsequent master buffered segment from a different input stream in response to receiving an indication of a timeout in the input stream.

Further disclosed herein is a non-transitory computer readable medium comprising computer executable instructions that in response to execution cause a computing system to perform operations that include identifying segment boundaries in an ingested input stream and segmenting the input stream based on the segment boundaries. The operations can include buffering segments of a plurality of input streams, wherein the buffering includes indexing and storing buffered segments in a memory. The operations can further include selecting a master buffered segment per a time period from among the buffered segments for delivery to a content distribution network.

The following description and the annexed drawings set forth in detail certain illustrative aspects of this disclosure. These aspects are indicative, however, of but a few of the various ways in which the principles of this disclosure may be employed. This disclosure is intended to include all such aspects and their equivalents. Other advantages and distinctive features of this disclosure will become apparent from the following detailed description of this disclosure when considered in conjunction with the drawings.

DETAILED DESCRIPTION

Overview

Figure 1:
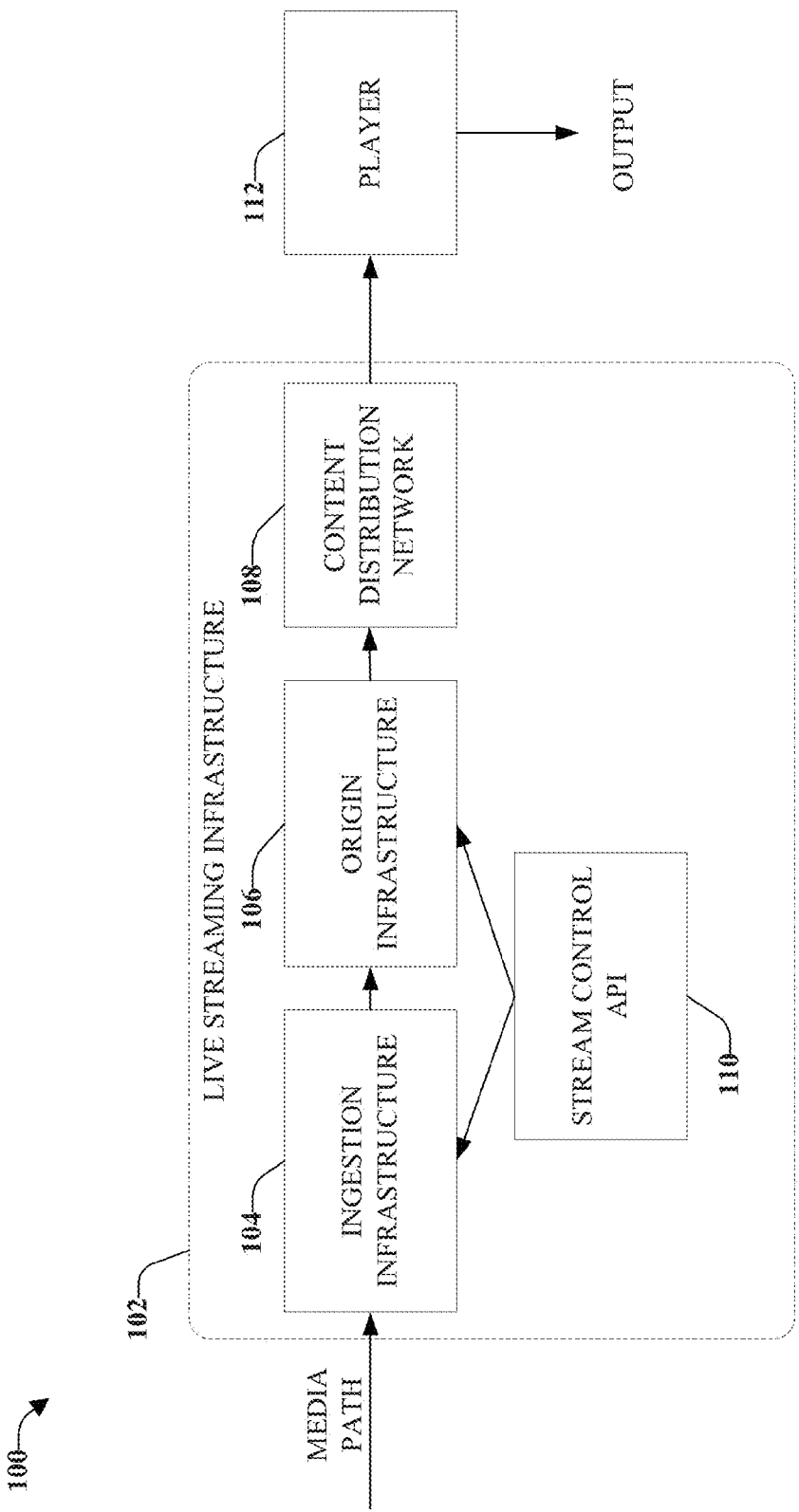
FIG. 1 is a block diagram illustrating an example, non-limiting embodiment of a live streaming infrastructure in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

It is to be appreciated that in accordance with one or more implementations described in this disclosure, live streaming input streams can be coherently processed in parallel ingestion pipelines. If errors occur during the ingestion and/or processing of the input stream, the live streaming and ingestion infrastructure can switch between the parallel input streams to provide reliable live streaming feeds to the content distribution network.

In an embodiment, the live streaming platform can operate entirely within the 'cloud' environment, and thus the system can be provided invisibly to the end-user. Providing the live streaming platform in the cloud environment means that the ingestion infrastructures can be servers that receive the incoming multicast live streams, process the live streams, and deliver a robust and stable stream to various players, also based on servers, that deliver the live stream to the end-user. The end-user can access the live stream via a web browser or lightweight application. Coherent streams can be created from multiple ingestion paths and upon a failure of any part of one of the streams, a whole, single stream can be reconstructed from the coherent streams.

Exact replicas of input streams can be processed in parallel ingestion pipelines and the input streams can be transcoded into desired output streams (at different bitrates) while preserving time information of the streams (timestamps). The streams can be coherently segmented using a stable segmentation function that identifies segment boundaries based on minimizing the modulo of the timestamp with the target segment duration. This can be accomplished, for example, by initializing the segmentation process at a common key frame across all the sub-streams, resulting in identically segmented redundant input streams.

For each time period, one segment can be selected from the redundant streams to be the master segment that is used to construct the single stream. This distributed master stream selection can be based on the availability or reliability of a particular segment for all bit rates. The algorithm used to select which of the segments is made available for the next step can minimize stream discontinuity by maintaining pipeline affinity whenever possible by selecting subsequent segments from the same ingestion pipeline.

The master stream selection operates between a reliable stream controller and the per pipeline chunk manager, which communicate with the master periodically upon receipt of a new set of segments. One live chunk manager is selected as master for a given stream and the selected live chunk manager outputs the current segments to the next processing step (indexing and storage). Non-perfect copies of the stream can also be handled at input by exploiting time continuity. In this case, some stream glitches are possible during a failover, but the same stream affinity logic minimizes the occurrence of these artifacts.

Referring now to the drawings, FIG. 1 illustrates a block diagram of an example live streaming system 100 in accordance with various aspects and implementations is shown. Live streaming infrastructure 102 can be provided to ingest and/or process live media feeds and distribute them to media players 112. Media players 112 can interpret the video signals and display the output using the native media stack of each of the target platforms. Players 112 can also include integrated monetization modules.

The live streaming infrastructure 102 can include ingestion infrastructure 104, origin infrastructure 106, content distribution network 108, and a stream/event control application programming interface ("API") 110. Ingestion infrastructure 104 can receive incoming media feeds and redundantly process the live feeds in separate pipelines. Origin infrastructure 106 can save the live media streams to memory, and prepare the live streams for delivery to the content distribution network 108 which delivers the live media stream to the media players 112. The stream control API 110 can give broadcasting partners the ability to start and/or stop an event, configure monetization settings, and in general manage the set of broadcast events and their lifecycle.

Figure 2:
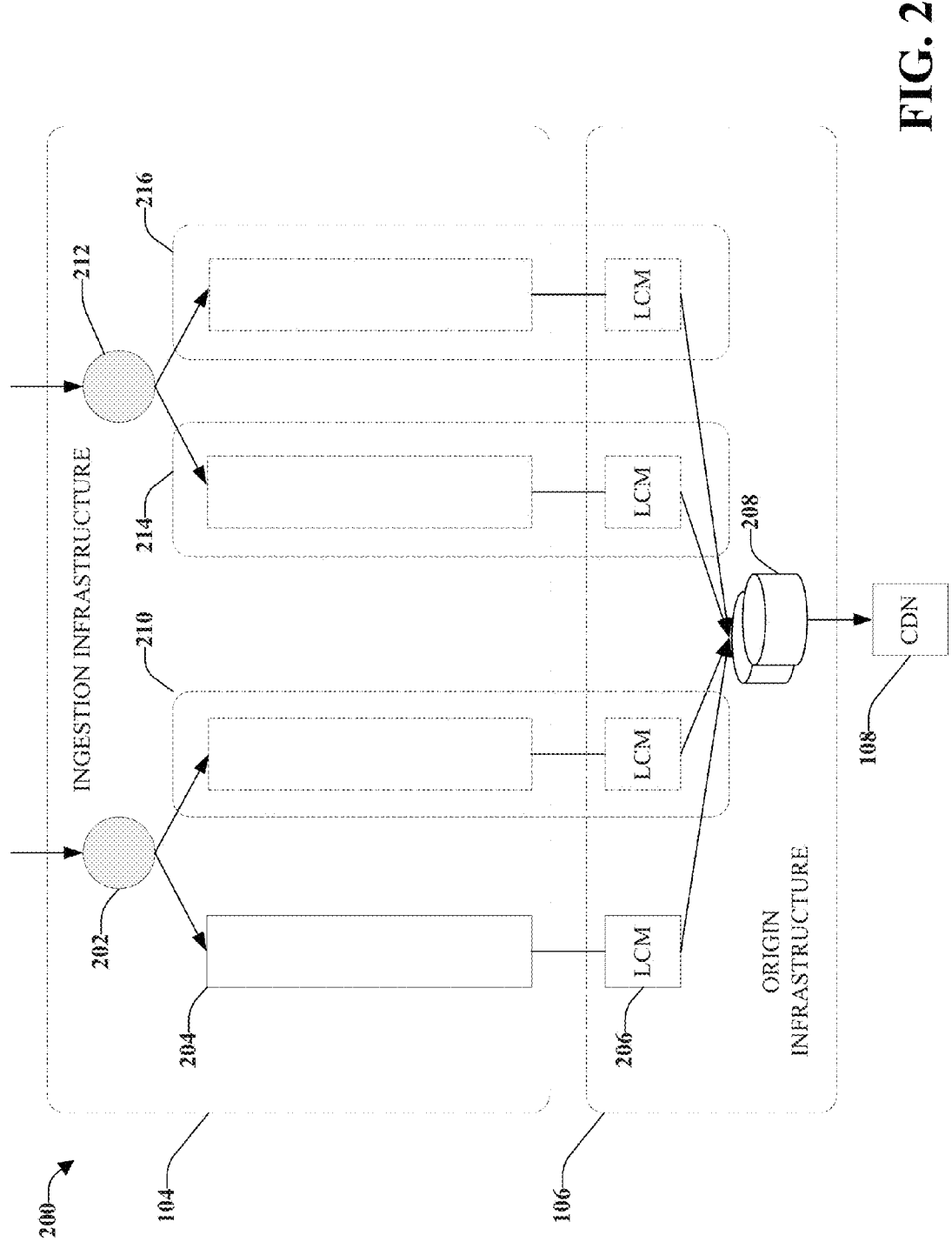
FIG. 2 is a block diagram illustrating an example, non-limiting embodiment of a redundant ingestion system with parallel ingestion pipelines in accordance with various aspects and implementations described herein.

Turning now to FIG. 2, a block diagram illustrating an example, non-limiting embodiment of a redundant ingestion system 200 with parallel ingestion pipelines in accordance with various aspects and implementations is shown. In the ingestion infrastructure 104, redundant live media streams are received at ingestion entry points 202 and 212. Once received, the redundant live media streams are ingested and processed by the parallel pipelines 204, 210, 214, and 216 and eventually saved to a memory 208 in the origin infrastructure 106 by live chunk managers (e.g. 206), before being distributed via a content distribution network 108.

The ingestion entry points 202 and 212 can receive multicast signals acquired through direct peering with the broadcast originator or via real time messaging protocol ("RMTP") signals acquired through a worldwide network of ingestion servers. Ingestion entry points 202 and 212 can also receive input streams from hypertext transfer protocol ("HTTP") based ingestion via resumable POST request and as a pre-segmented stream (independent POST with a session indicator). The Ingestion entry points 202 and 212 can also receive the live media streams from other sources commonly used for delivering live media feeds. Once the redundant live media streams are received, parallel ingestion pipelines 204, 210, 214, and 216 can ingest and process the redundant live media streams in parallel. It is to be appreciated that while FIG. 2 depicts pipelines 204 and 210 processing live streams from entry point 202, and pipelines 214 and 216 are processing live streams from entry point 212, there can be any combination of pipelines and entry points. In some embodiments, there can be fewer or greater than two parallel pipelines per entry point, and in other embodiments, there can be more or less than two entry points.

Ingestion pipelines 204, 210, 214, and 216 can process and prepare the live streams for delivery to the content distribution network 108. Processing modules such as segmentation components, buffering components, and transcoding segments can be included in the ingestion pipelines 204, 210, 214, and 216. The ingestion pipelines can also include packager and/or encryption components to package the stream into a container format and/or encrypt it. The pipelines can also include a delay component that can insert a delay into the live media stream.

The segmentation components in pipelines 204, 210, 214, and 216 can identify segment boundaries in the ingested input stream and segment the input stream based on the segment boundaries. The buffer components can buffer the segments of the parallel input streams in a memory, and a master selection component in ingestion infrastructure 104 can select a master buffered segment per a segment time period to be saved and delivered to the content distribution network 108. A live chunk manager that is associated with the pipeline that is selected for each buffered segment outputs the segment to the next step in the origin infrastructure 106 for indexing and storage before delivery to the content distribution network 108. This arrangement of parallel ingestion pipelines scales robustness of the system at all layers, from ingestion of the source material to encoding, storage, conversion into on-demand assets, publishing, and streaming.

In some embodiments, to maintain time-continuity it is preferable to use the output from one of the parallel pipelines to be indexed and stored in memory 208 for delivery via the content distribution network 108 if there are no errors or timeouts in the stream. This pipeline-affinity can minimize the number of potential glitches during failover switches to another pipeline. If there are errors in the stream though, and one of the redundant streams from another parallel pipeline is selected, having the streams segmented in parallel, can minimize live stream disruptions.

Thus, in referring to FIG. 2 for example, the input stream from ingestion pipeline 204 can be the master stream that is written by live chunk manager 206 to the memory. 208. Pipelines 210, 214, and 216 have redundant streams that are parallel to the input stream of pipeline 204, but are not selected unless the input stream of pipeline 204 is disrupted. Upon disruption, the master selection component in the ingestion infrastructure 104, can select one of pipelines 210, 214, or 216 and one of their associated live chunk managers to index and store their input streams as the master stream.

Figure 3:
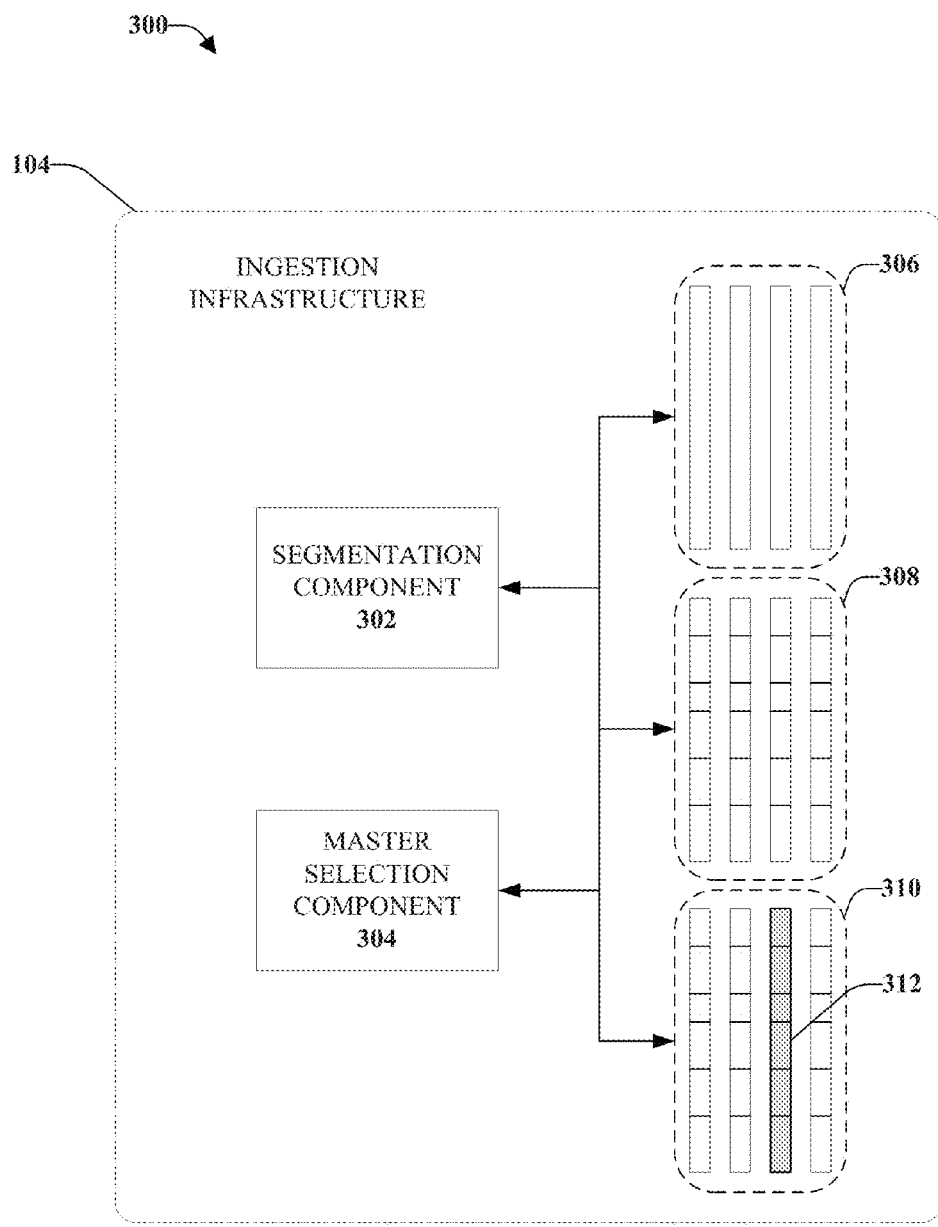
FIG. 3 is a block diagram illustrating an example, non-limiting embodiment of a system that can segment redundant streams and select a master segment in accordance with various aspects and implementations described herein.

Turning now to FIG. 3, a block diagram illustrating an example, non-limiting embodiment of a system 300 that can segment redundant streams and select a master segment in accordance with various aspects and implementations is illustrated. System 300 can include part of ingestion infrastructure 104 with segmentation component 302 and master selection component 304. Parallel ingestion pipelines with live media streams are shown at different stages of processing at 306, 308, and 310. It is to be appreciated that while FIG. 3 shows one segmentation component 302 and one master selection component 304 in the ingestion infrastructure 104, this is done for simplicity, and each of the parallel ingestion pipelines can include segmentation components and master selection components.

Segmentation component 302 can identify segment boundaries in an ingested input stream and then segment the input stream based on the segment boundaries. The segmentation component 302 can segment each of the parallel ingested input streams in each of the pipelines as well, or alternatively separate segmentation components can segment the separate input streams.

Segment component 302 receives the un-segmented input stream 306 and identifies segments in the input stream. In some embodiments, segment boundaries identified can be based on the number of frames (i.e. start a new segment every n frames). Alternatively, in other embodiments, segment boundaries can be based on the types of frames (i.e. start a new segment every intra frame or inter frame). Other segmentation functions can identify segment boundaries based on minimizing the modulo of the timestamp with the target segment duration.

In an aspect of the disclosure, to maintain parallelism of the input streams, the algorithm or function that segmentation component 302 uses to identify segment boundaries should be stable over each of the input streams so that the segments boundaries identified and segmented are the same for each of the input streams. To accomplish this, in some embodiments, the segmentation component 302 and/or each of the individual segmentation components, can start looking for segment boundaries at a common key frame. In other embodiments, segmentation component 302 can start segmenting at the beginning of a stream.

In another embodiment, the segmentation component 302 can use an algorithm that is robust to stream discontinuities. Therefore, in the event of a failure or discontinuity of an input stream, the parallelism of the segmenting of the input streams will not be interrupted.

Once segmentation component 302 identifies the segments, the input streams 306 can be segmented, and the segmented input streams 308 are the result of the segmenting. There can be one segment in each of the input streams per time period. The time period can be based on the length of the segment or the length of the segment can be based on the length of the time period. Each of the segments in segmented input streams 308 can be interchangeable, such that a coherent master stream can be selected from one of the segments from one of the input streams per time period.

Master selection component 304 selects a master segment per a time period from among the segments for delivery to a content distribution network. In some embodiments, to maintain pipeline affinity and minimize glitches, master selection component 304 will select consecutive segments from the same pipeline (e.g. 312) to be master segments. Ingestion pipelines 310 carry redundant streams and master stream 312 is selected to be delivered by a live chunk manager (e.g. 206) to be indexed and stored in a memory (e.g. 208).

In an aspect of the present disclosure, master selection component 304 will maintain pipeline affinity and continue to select segments from the same pipeline until a reliability signal of the master stream 312 falls below a threshold value, and the master selection component 304 switches to a master segment from a different input stream. A received timeout can also trigger the master selection component 304 to switch to a different input stream. In other embodiments, master selection component 304 can select a master segment from among all the segments per a time period based on a reliability signal of the buffered segment. In some cases, the most reliable segment per a time period can be selected to be the master segment.

Figure 4:
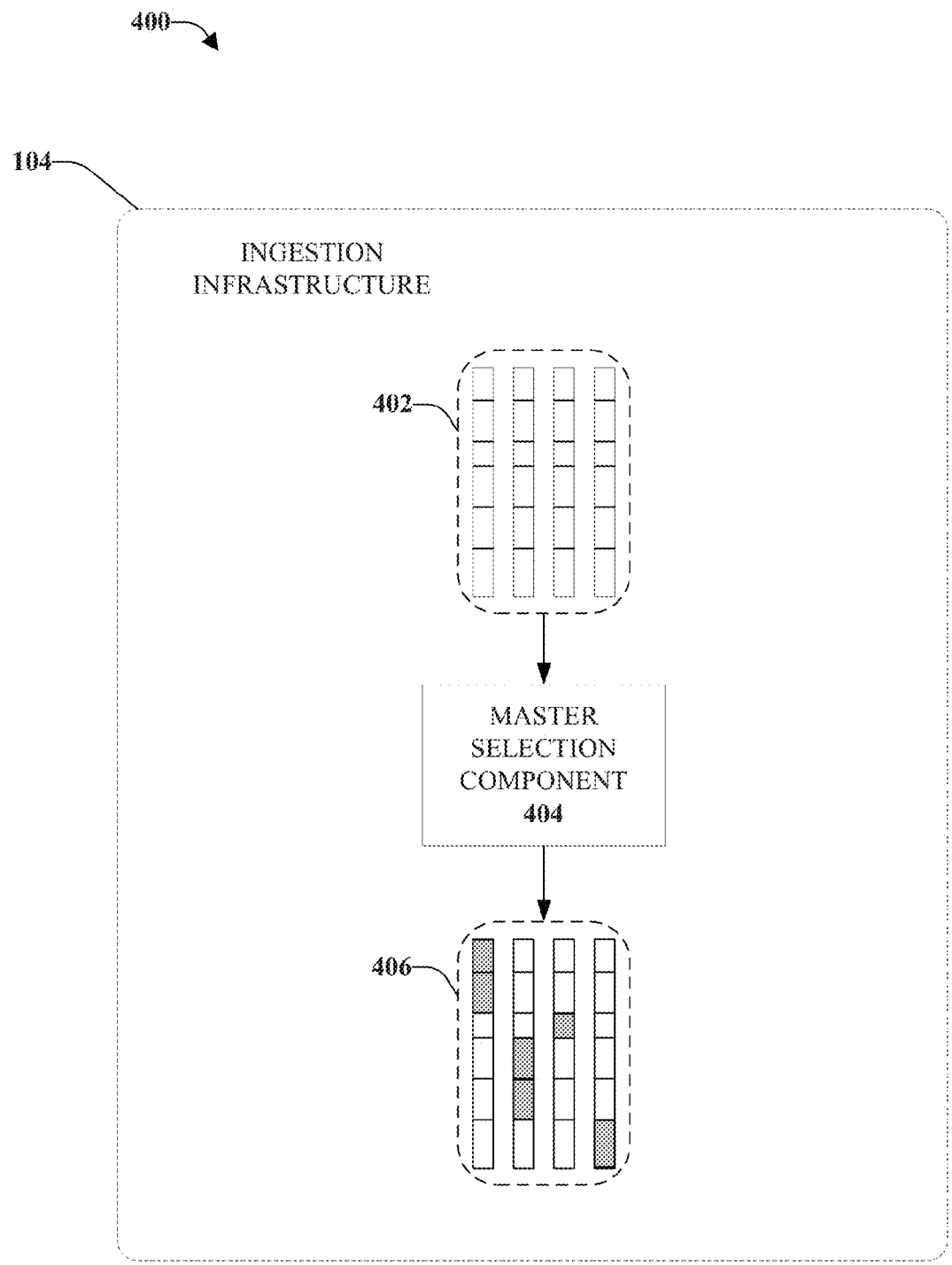
FIG. 4 is a block diagram illustrating an example, non-limiting embodiment of a system that can select segments from various mirrored streams in accordance with various aspects and implementations described herein.

In FIG. 4, a block diagram illustrating an example, non-limiting embodiment of a system 400 that can select segments from various mirrored streams in accordance with various aspects and implementations is shown. In some embodiments, maintaining pipeline and/or stream affinity may not be possible or desirable. Master selection component 404 can receive the segmented parallel ingestion pipelines 402 from which to select the master segments. The parallel pipelines shown in 406 have master segments selected by the master selection component 404, where the master segments are distributed among the pipelines. Master selection component 404 can select one segment per a time period based on a reliability signal of the segments, or the reliability of the input stream at that time period. Thus master segments from a number of different streams can be used to construct the master stream that is eventually distributed by the content distribution network (e.g. 108).

Figure 5:
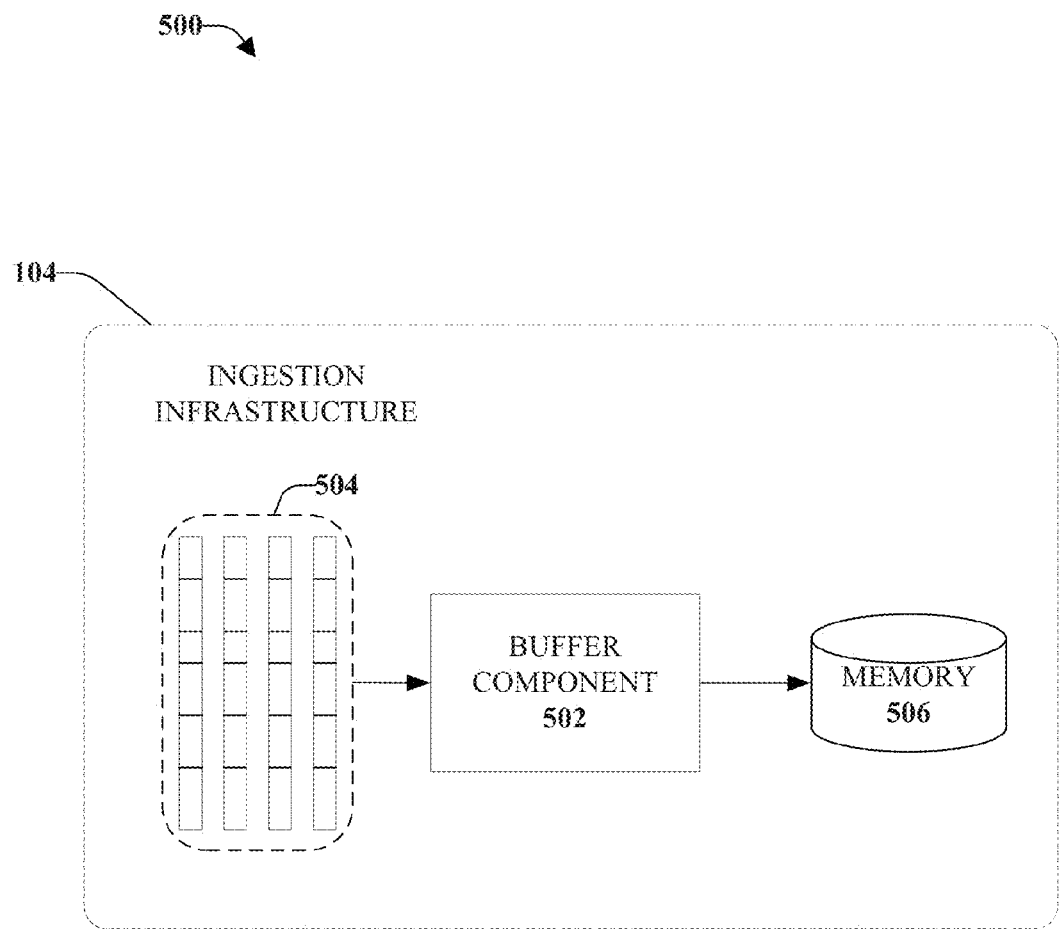
FIG. 5 is a block diagram illustrating an example, non-limiting embodiment of a system that can buffer segments of parallel streams in a memory in accordance with various aspects and implementations described herein.

Turning now to FIG. 5, a block diagram illustrating an example, non-limiting embodiment of a system 500 that can buffer segments of parallel streams in a memory in accordance with various aspects and implementations is shown. A buffer component 502 can be provided in ingestion infrastructure 104 to buffer segments of a plurality of input streams from parallel ingestion pipelines 504 into a memory 506. The buffered segments can be indexed and stored in the memory prior to or after selection by the master selection component (e.g. 304, 404).

It is to be appreciated that while FIG. 5 depicts there being one buffer component and one memory storage for all of the pipelines 504, there can be multiple buffer components and memory storages. For example, there can be one buffer component per ingestion pipeline, buffering the segments of each input stream into separate memory storages.

Figure 6:
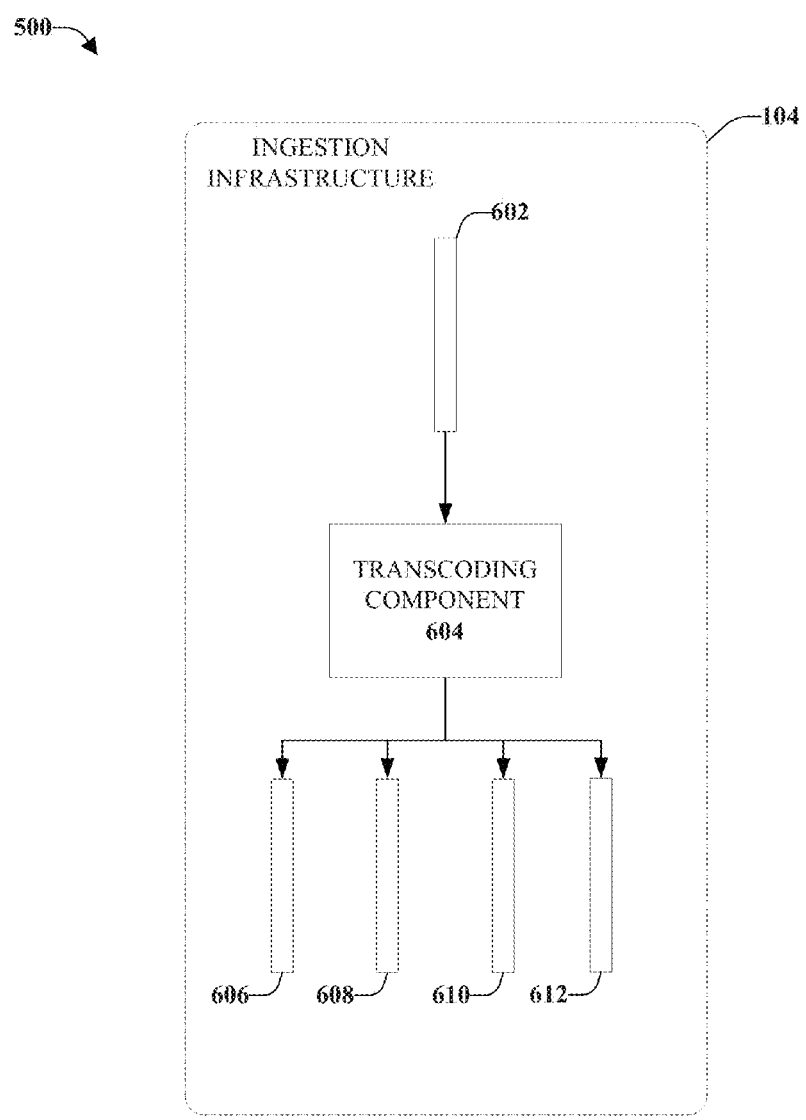
FIG. 6 is a block diagram illustrating an example, non-limiting embodiment of a system that can transcode an input stream into multiple output streams in accordance with various aspects and implementations described herein.

Turning now to FIG. 6, a block diagram illustrating an example, non-limiting embodiment of a system 600 that can transcode an input stream into multiple output streams in accordance with various aspects and implementations is shown. Transcoding component 604 can be provided in ingestion infrastructure 104 to transcode and/or encode an input stream 602 into a variety of output streams 606, 608, 610, and 612. The input stream 602 can be received in raw form (e.g. MPEG-2, Transport Stream "M2TS") and transcoding component 604 can encode the raw stream into a variety of output streams. The output streams can be in different container formats and/or bitrates. The transcoding component 604 can preserve time stamp information in each of the output streams.

In some embodiments, transcoding component 604 can split the input stream into multiple output streams in each of the ingestion pipelines. Each parallel ingestion pipeline would therefore have a variety of streams with different bitrates and/or container formats. These streams are segmented, and when the master selection component (e.g. 304, 404) selects a master segment, the master segment would include each of the various streams outputted by the transcoding component 604.

In an aspect of the present disclosure, a timeout, or a disruption in any of the transcoded streams in the segment can cause the master selection component to select a master segment from another redundant ingestion pipeline.

Figure 7:
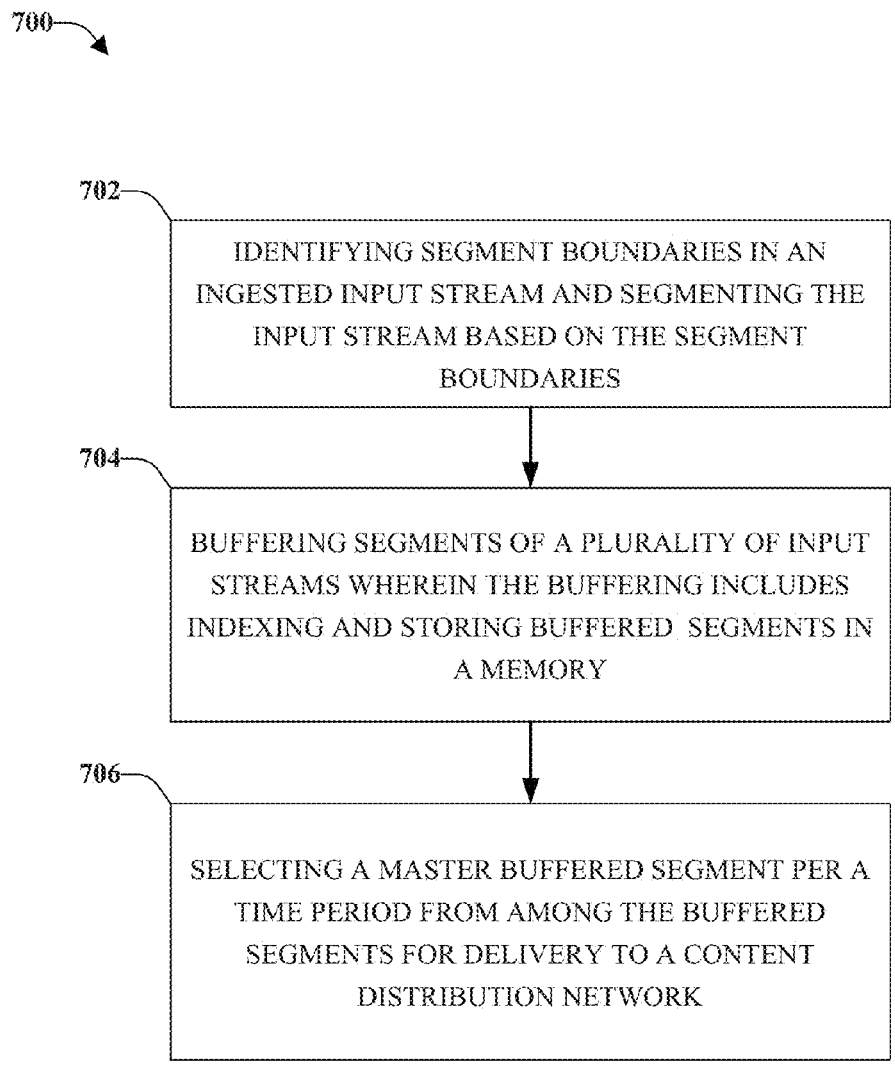
FIG. 7 illustrates a flow diagram of an example, non-limiting embodiment for segmenting input streams and selecting segments in accordance with various aspects and implementations described herein.

FIG. 7 illustrates an exemplary flow diagram 700 of an example non-limiting embodiment of a methodology for segmenting input streams and selecting segments according to an aspect of the present disclosure. For simplicity of explanation, the method is depicted and described as a series of acts. However, acts in accordance with this disclosure can occur in various orders and/or concurrently, and with other acts not presented and described herein. Furthermore, not all illustrated acts may be required to implement the method in accordance with the disclosed subject matter. In addition, those skilled in the art will understand and appreciate that the method could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in FIG. 1-6 can be and are intended to be implementable as methods and/or in accordance with the following depicted method.

At 702, segment boundaries in an ingested input stream are identified and the input stream is segmented (e.g. by segmentation component 302) based on the segment boundaries. Segment boundaries can be identified based on the number of frames (i.e. start a new segment every n frames). Alternatively, in other embodiments, segment boundaries can be based on the types of frames (i.e. start a new segment every intra frame or inter frame). Other segmentation functions can identify segment boundaries based on minimizing the modulo of the timestamp with the target segment duration.

Segment boundaries of a plurality of input streams can identified. To ensure that the input streams are processed in parallel, the algorithm or function that is used to identify segment boundaries should be stable over each of the input streams so that the segments boundaries identified and segmented are the same for each of the input streams. To accomplish this, in some aspects of the disclosure, the segmenting and identifying processes can initiate at a common key frame across all of the input streams. Alternatively, the identifying can be initiated from the beginning of the stream.

Once the segment boundaries are identified, the streams can be segmented based on the boundaries. There can be one segment in each of the input streams per time period. The time period can be based on the length of the segment or the length of the segment can be based on the length of the time period. Each of the segments per a time period can be interchangeable such that a reconstructed master stream can be composed of any of the segments in the input streams per a time period.

At 704, the segments of the plurality of input streams are buffered (e.g. by buffer component 502), wherein the buffering includes indexing and storing buffered segments in a memory. At 706, one master buffered segment per a time period is selected (e.g. by master selection components 304 and 404) from among the buffered segments for delivery to a content distribution network.

In some embodiments, to maintain pipeline affinity and minimize glitches, consecutive segments from the same pipeline can be selected to be master segments until a reliability of the master stream falls below a threshold or predetermined value, and the master segment can be selected from a different input stream. A timeout in a segment or an input stream can also trigger a switch to a different input stream. In other embodiments, a master segment can be selected from among all the segments per a time period based on a reliability signal of the buffered segment. In some cases, the most reliable segment per a time period can be selected to be the master segment.

Figure 8:
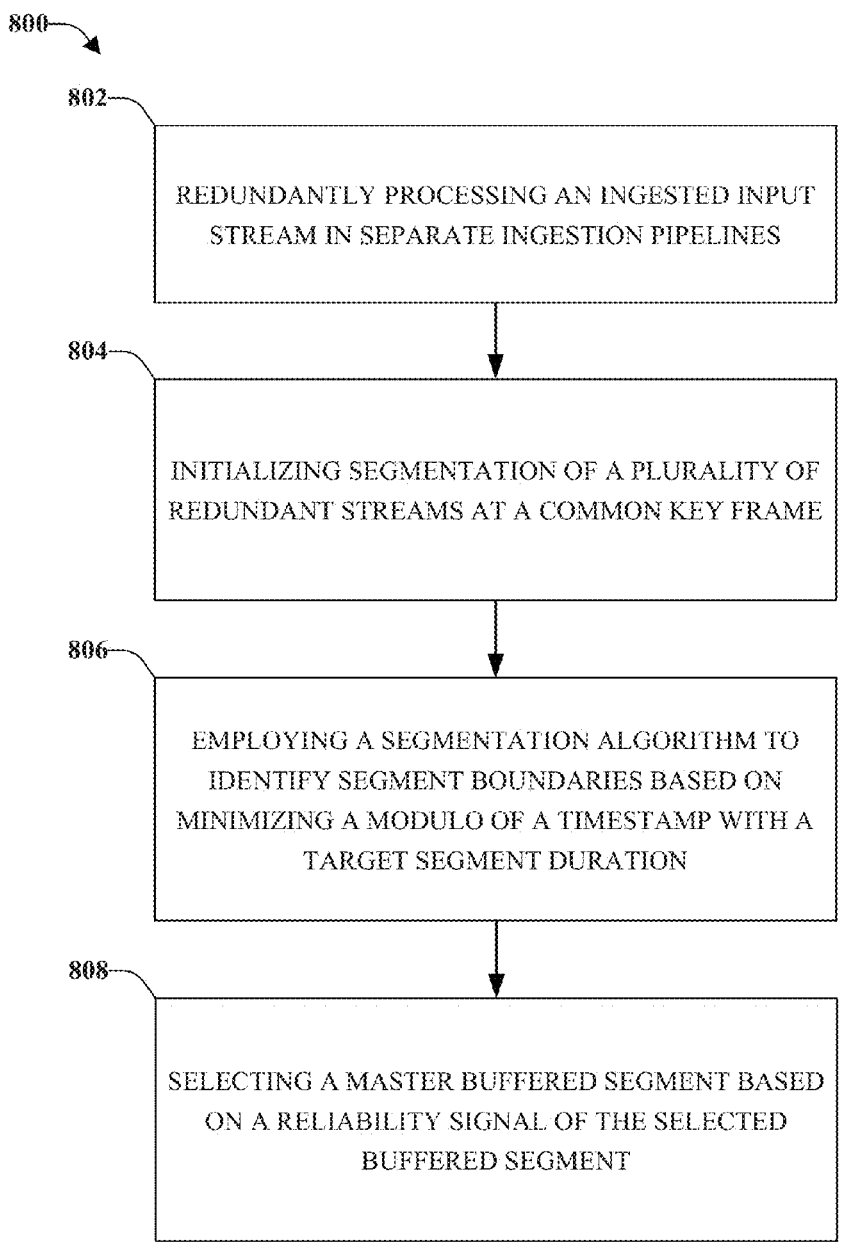
FIG. 8 illustrates a flow diagram of an example, non-limiting embodiment for segmenting input streams and selecting segments in accordance with various aspects and implementations described herein.

FIG. 8 illustrates a flow diagram of an example, non-limiting embodiment for segmenting input streams and selecting segments in accordance with various aspects and implementations described herein. It is to be appreciated that the detailed description of such acts in FIGS. 1-6 can be and are intended to be implementable as methods and/or in accordance with the following depicted method.

At 802, an ingested input stream can be redundantly processed in separate ingestion pipelines. The ingested input stream can be mirrored between the separate ingestion pipelines. The separate ingested input streams can also be processed in parallel pipelines such that several levels of redundancy ensure that disruptions to one or more of the pipelines can be mitigated.

At 804, segmentation of a plurality of redundant streams can be initialized at a common key frame. This ensures that the input streams are processed in parallel such that the identified segment boundaries are the same for each of the input streams. At 806, a segmentation algorithm is employed to identify segment boundaries based on minimizing a modulo of a time stamp with a target segment duration.

At 808, a master buffered segment is selected based on a reliability signal of the selected buffered segment. To maintain pipeline affinity, subsequent master buffered segments can be selected from the same pipeline and/or input stream until a reliability of the input stream or master buffered segment falls below a predetermined value. Alternatively, the buffered segment per a time period with the highest reliability can be selected as a master buffered segment.

Exemplary Computing Device

Figure 9:
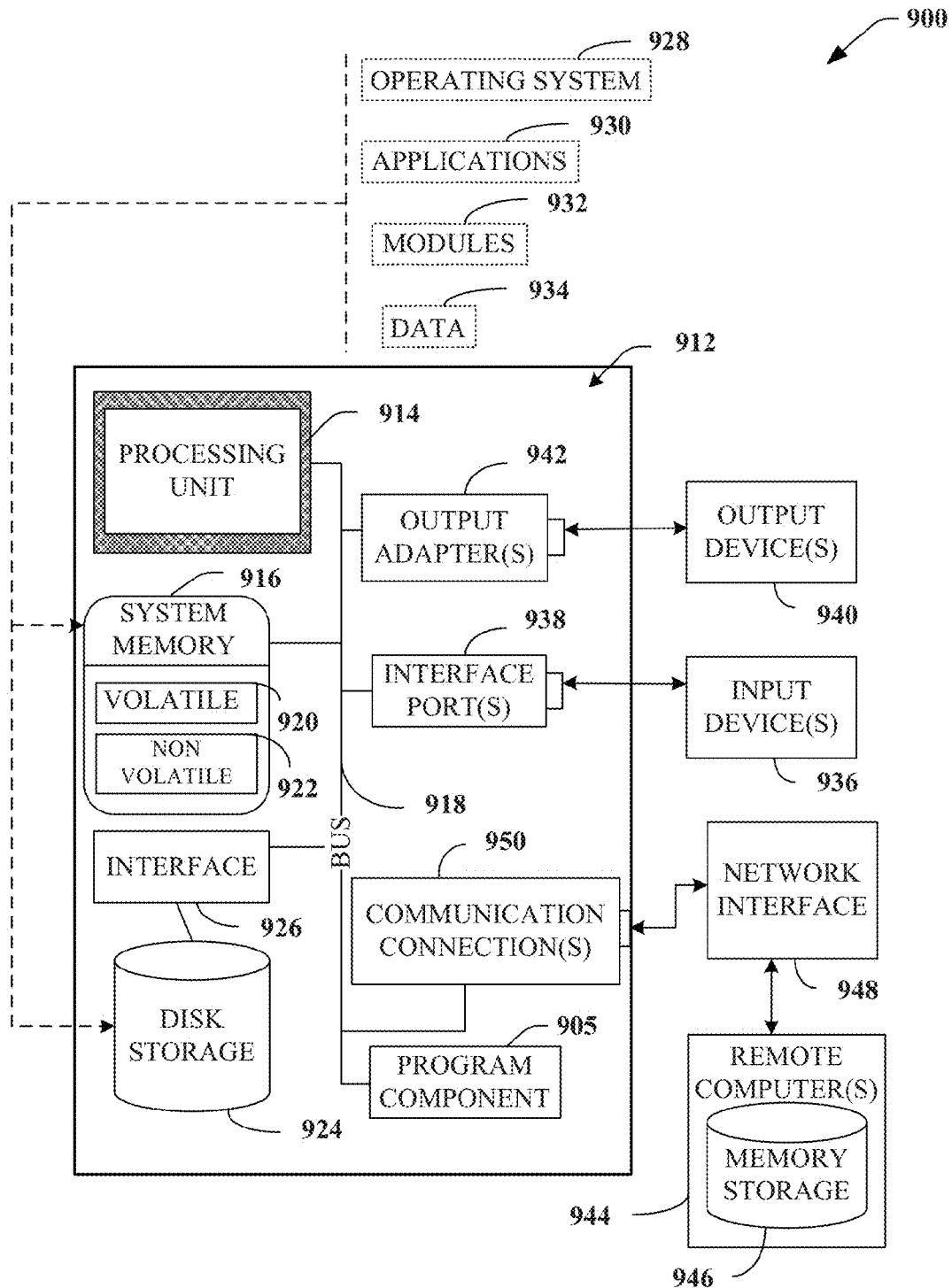
FIG. 9 is a block diagram illustrating an example computing device that is arranged in accordance with various aspects and implementations described herein.

With reference to FIG. 9, a suitable environment 900 for implementing various aspects of this disclosure includes a computing device 912. It is to be appreciated that the computer 912 can be used in connection with implementing one or more of the systems or component shown and described in connection with FIGS. 1-6. The computing device 912 includes a processing unit(s) 914, a system memory 916, and a system bus 918. The system bus 918 couples system components including, but not limited to, the system memory 916 to the processing unit 914. The processing unit(s) 914 can be any of various available processors. Dual microprocessors and other multiprocessor architectures also can be employed as the processing unit(s) 914.

The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 994), and Small Computer Systems Interface (SCSI).

The system memory 916 includes volatile memory 920 and nonvolatile memory 922. The basic input/output system (BIOS), containing the basic routines to transfer information between elements within the computing device 912, such as during start-up, is stored in nonvolatile memory 922. By way of illustration, and not limitation, nonvolatile memory (e.g., 922) can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory (e.g., 920) includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM. Additionally, the disclosed memory components of systems or methods herein are intended to include, without being limited to including, these and any other suitable types of memory.

Computing device 912 can also include removable/non-removable, volatile/non-volatile computer storage media. FIG. 9 illustrates, for example, a disk storage 924. Disk storage 924 includes, but is not limited to, devices like a magnetic disk drive, flash drive, floppy disk drive, tape drive, Jaz drive, Zip drive, LS-100 drive, flash memory card, or memory stick. The disk storage 924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used, such as interface 926.

FIG. 9 also depicts software that acts as an intermediary between users and the basic computer resources described in the suitable operating environment 900. Such software includes, for example, an operating system 928. Operating system 928, which can be stored on disk storage 924, acts to control and allocate resources of the computing device 912. System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems.

A user enters commands or information into the computing device 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computing device 912, and to output information from computing device 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computing device 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computing device 912. For purposes of brevity, only a memory storage device 946 is illustrated with remote computer(s) 944. Remote computer(s) 944 is logically connected to computing device 912 through a network interface 948 and then physically connected via communication connection 950. Network interface 948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computing device 912, it can also be external to computing device 912. The hardware/software necessary for connection to the network interface 948 includes, for exemplary purposes only, internal and external technologies such as, modems including regular telephone grade modems, cable modems and DSL modems, ISDN adapters, Ethernet cards, and wireless networking cards.

In accordance with various aspects and implementations, the computing device 912 can be used segment redundant input streams and select a master segment from among the input streams per a time period. Computing device 912 can also transcoded an input stream into output streams with varying bitrates and/or container formats. As more fully disclosed herein, in some implementations, the computing device 912 can include one or more processors (e.g., 914) that can be used to process data, including processing data to perform various tasks (e.g., identifying segment boundaries, segmenting the input streams based on the segment boundaries, buffering segments and indexing and storing the buffered segments in memory, and selecting a master buffered segment per a time period from among the buffered segments, etc.). The computing device 912 can include a program component 905 that can be associated with (e.g., communicatively connected to) the one or more processors. The program component 905 can contain, for example, a segmentation component, a buffer component, a master selection component, and a transcoding component, and/or other components, which can respectively function as more fully disclosed herein, to facilitate embodiments of the disclosure described herein.

Exemplary Networked and Distributed Environments

Figure 10:
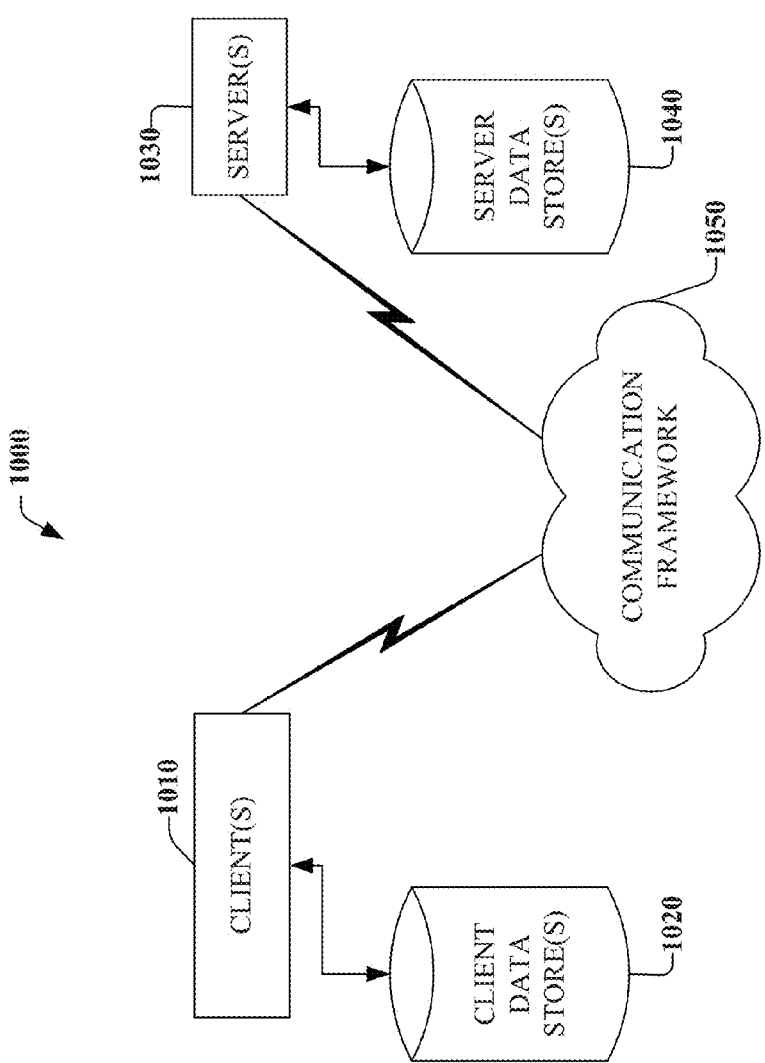
FIG. 10 is a block diagram illustrating an example networking environment in accordance with various aspects and implementations of this disclosure.

FIG. 10 is a schematic block diagram of a sample-computing environment 1000 in accordance with implementations of this disclosure. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing this disclosure, for example. One possible communication between a client 1010 and a server 1030 may be in the form of a data packet transmitted between two or more computer processes.

The system 1000 includes a communication framework 1050 that can be employed to facilitate communications between the client(s) 1010 and the server(s) 1030. The client(s) 1010 are operatively connected to one or more client data store(s) 1020 that can be employed to store information local to the client(s) 1010. Similarly, the server(s) 1030 are operatively connected to one or more server data store(s) 1040 that can be employed to store information local to the servers 1030.

It is to be appreciated and understood that components, as described with regard to a particular system or method, can include the same or similar functionality as respective components (e.g., respectively named components or similarly named components) as described with regard to other systems or methods disclosed herein.

It is to be noted that aspects or features of this disclosure can be used with substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be used with legacy telecommunication technologies, e.g., GSM. In addition, mobile as well non-mobile networks (e.g., the Internet, data service network such as internet protocol television (IPTV), etc.) can be used with aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system. In the cloud computing system, computing can be delivered as a service, rather than a product. Thus, resources, software, and information can be shared between computers and servers over a network. End-users access cloud-based applications through a web browser, or other light weight desktop or mobile app while the business software and data are stored on servers at remote locations.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Reference throughout this specification to "one implementation," or "an implementation," or "one embodiment," or "an embodiment" means that a particular feature, structure, or characteristic described in connection with the implementation or embodiment is included in at least one implementation or one embodiment. Thus, the appearances of the phrase "in one implementation," or "in an implementation," or "in one embodiment," or "in an embodiment" in various places throughout this specification can, but are not necessarily, referring to the same implementation or embodiment, depending on the circumstances. Furthermore, the particular features, structures, or characteristics may be combined in any suitable manner in one or more implementations or embodiments.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

What has been described above includes examples of systems and methods of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
 a memory that has stored thereon computer executable components;
 a processor that executes the following computer executable components stored in the memory:
 a segmentation component that identifies segment boundaries in an ingested input stream and segments the input stream based on the segment boundaries;
 a buffer component that buffers segments of a plurality of input streams, wherein buffered segments are indexed and stored in a memory; and
 a master selection component that analyzes a reliability rating of each of the buffered segments and selects a master buffered segment per a time period from among the buffered segments for delivery to a content distribution network, wherein the master buffered segment is selected based on the reliability rating of the master buffered segment exceeding a threshold reliability rating based on a predetermined criterion, and further selects a subsequent master buffered segment from a same input stream unless a reliability rating of the subsequent segment drops below the threshold reliability rating.

2. The system of claim 1, wherein the ingested input stream is processed redundantly in separate ingestion pipelines.

3. The system of claim 2, further comprising a redundant input stream that is processed redundantly in a second set of separate ingestion pipelines.

4. The system of claim 1, further comprising a transcoding component that transcodes the input stream into a plurality of output streams with different bitrates and formats.

5. The system of claim 1, wherein there is one segmentation component per ingestion pipeline.

6. The system of claim 5, wherein each of the segmentation components starts segmenting at a common key frame in the plurality of input streams.

7. The system of claim 1, wherein the ingested input stream is a live stream.

8. The system of claim 4, wherein the master selection component selects the master buffered segment from among the buffered segments of the plurality of the input streams based on a reliability signal of the buffered segment for each of the different bitrates and formats.

9. The system of claim 1, wherein the master selection component switches to a different input stream for a subsequent master buffered segment in response to a reliability of the input stream falling below a threshold value.

10. The system of claim 1, wherein the master selection component switches to a different input stream for a subsequent segment in response to receiving an indication of a timeout in the input stream.

11. A method, comprising:
  using a processor to execute computer executable instructions stored in a memory to perform the following acts:
  identifying segment boundaries in an ingested input stream and segmenting the input stream based on the segment boundaries;
  buffering segments of a plurality of input streams, wherein the buffering includes indexing and storing buffered segments in a memory;
  determining a reliability of each of the buffered segments;
  selecting a master buffered segment per a time period from among the buffered segments for delivery to a content distribution network, wherein the selecting is based on the reliability of the master buffered segment satisfying a predetermined criterion; and
  selecting a subsequent master buffered segment from a same input stream unless a reliability rating of the subsequent segment drops below the threshold reliability rating.

12. The method of claim 11, wherein the identifying segment boundaries in an ingested input stream further comprises identifying segment boundaries in a live stream.

13. The method of claim 11, further comprising redundantly processing the ingested input stream in separate ingestion pipelines.

14. The method of claim 13, further comprising redundantly processing a redundant ingested input stream in a second set of separate ingestion pipelines.

15. The method of claim 11, further comprising transcoding the input stream into output streams with different bitrates and formats.

16. The method of claim 13, further comprising initializing segmentation of a plurality of redundant streams at a common key frame.

17. The method of claim 11, further comprising selecting a subsequent master buffered segment from a different input stream in response to receiving an indication of a timeout in the input stream.

18. The method of claim 15, wherein the selecting the master buffered segment is based on a reliability signal of a selected buffered segment for each of the different bitrates and formats.

19. The method of claim 11, further comprising selecting a subsequent master buffered segment from a same input stream unless a reliability of the subsequent segment drops below a threshold value.

20. A non-transitory computer readable storage medium comprising computer-executable instructions, that in response to execution, cause a computing system to perform operations, comprising:
  identifying segment boundaries in an ingested input stream and segmenting the input stream based on the segment boundaries;
  buffering segments of a plurality of input streams, wherein the buffering includes indexing and storing buffered segments in a memory;
  determining a reliability rating for each buffered segment of the buffered segments;
  selecting a master buffered segment per a time period from among the buffered segments for delivery to a content distribution network wherein the selecting is based on the reliability rating of the master buffered segment meeting a threshold reliability rating that is based on a predetermined criterion; and
  selecting a subsequent master buffered segment from a same input stream unless a reliability rating of the subsequent segment drops below the threshold reliability rating.

21. The non-transitory computer readable storage medium of claim 20, wherein the operations further comprise:
  redundantly processing the ingested input stream in separate ingestion pipelines.

* * * * *